US009509463B2

(12) United States Patent
Bao et al.

(10) Patent No.: US 9,509,463 B2
(45) Date of Patent: Nov. 29, 2016

(54) METHOD FOR IMPLEMENTING LINK SELF-ADAPTATION, NETWORK DEVICE AND TERMINAL DEVICE

(75) Inventors: Dongshan Bao, Beijing (CN); Huijuan Yao, Beijing (CN); Jing Wang, Beijing (CN); Shenfa Liu, Beijing (CN); Lijun Pan, Beijing (CN); Jiaqing Wang, Beijing (CN); Xiaoyan Yu, Beijing (CN); Zhigang Yan, Beijing (CN)

(73) Assignee: BEIJING NUFRONT MOBILE MULTIMEDIA TECHNOLOGY CO., LTD, Beijing (CN)

( * ) Notice: Subject to any disclaimer, the term of this patent is extended or adjusted under 35 U.S.C. 154(b) by 175 days.

(21) Appl. No.: 14/009,039

(22) PCT Filed: Mar. 16, 2012

(86) PCT No.: PCT/CN2012/072433
§ 371 (c)(1),
(2), (4) Date: Sep. 30, 2013

(87) PCT Pub. No.: WO2012/130051
PCT Pub. Date: Oct. 4, 2012

(65) Prior Publication Data
US 2014/0286246 A1 Sep. 25, 2014

(30) Foreign Application Priority Data

Mar. 31, 2011 (CN) .......................... 2011 1 0081285
May 19, 2011 (CN) .......................... 2011 1 0130194
Jul. 6, 2011 (CN) .......................... 2011 1 0188947
Jul. 7, 2011 (CN) .......................... 2011 1 0188814
Feb. 10, 2012 (CN) .......................... 2012 1 0029178

(51) Int. Cl.
*H04W 4/00* (2009.01)
*H04L 5/00* (2006.01)
(Continued)

(52) U.S. Cl.
CPC ........... *H04L 5/0037* (2013.01); *H04L 1/0026* (2013.01); *H04L 1/0027* (2013.01); *H04L 1/16* (2013.01); *H04W 80/00* (2013.01); *H04B 7/0417* (2013.01); *H04W 84/12* (2013.01)

(58) Field of Classification Search
CPC . H04L 1/0026; H04L 1/0027; H04L 1/0029; H04L 1/0031; H04W 80/00
See application file for complete search history.

(56) References Cited

U.S. PATENT DOCUMENTS 7,804,800 B2 9/2010 Li et al.
7,885,604 B2 2/2011 Wee et al.
(Continued)

FOREIGN PATENT DOCUMENTS

CN   1 969 475    5/2007
CN   101 159 951  4/2008
(Continued)

OTHER PUBLICATIONS

Mazzarese et al.. "Proposed changes to the feedback polling A-MAP IE", IEEE 802.16 Broadband Wireless Access Working Group, Dec. 31, 2009, 12 sheets.
(Continued)

*Primary Examiner* — Brian O'Connor
(74) *Attorney, Agent, or Firm* — Anova Law Group, PLLC

(57) ABSTRACT

Disclosed is a method for implementing link self-adaptation, comprising: sending a downlink sounding channel and a channel quality information CQI feedback resource indication; and receiving CQI information, and selecting a suitable transmission mode for downlink data transmission according to the CQI information. Further disclosed are a network device and a terminal device. By using the method and devices provided in the present invention, the spectrum utilization rate and system performance can be improved.

20 Claims, 7 Drawing Sheets

(51) Int. Cl.
  *H04L 1/00*    (2006.01)
  *H04L 1/16*    (2006.01)
  *H04W 80/00*   (2009.01)
  *H04W 84/12*   (2009.01)
  *H04B 7/04*    (2006.01)

(56) References Cited

U.S. PATENT DOCUMENTS

| | | |
|---|---|---|
| 7,978,732 B2 | 7/2011 | Kim et al. |
| 8,089,911 B2 | 1/2012 | Huang et al. |
| 8,179,953 B2 | 5/2012 | Honta |
| 8,200,164 B2 | 6/2012 | Trainin et al. |
| 8,243,678 B2 | 8/2012 | Cudak et al. |
| 8,249,204 B2 | 8/2012 | Wu et al. |
| 8,326,324 B2 | 12/2012 | Wu et al. |
| 8,374,115 B2 | 2/2013 | Huang et al. |
| 8,446,869 B2 | 5/2013 | Lee et al. |
| 8,531,958 B2 | 9/2013 | Sivanesan et al. |
| 8,605,610 B2* | 12/2013 | Hwang et al. ............... 370/252 |
| 8,737,504 B2 | 5/2014 | Liu et al. |
| 8,804,688 B2 | 8/2014 | Park et al. |
| 8,942,164 B2* | 1/2015 | Onggosanusi et al. ....... 370/328 |
| 8,982,750 B2 | 3/2015 | Palanki et al. |
| 8,989,156 B2* | 3/2015 | Yin ...................... H04L 1/0009 370/335 |
| 2006/0093065 A1 | 5/2006 | Thomas et al. |
| 2007/0104174 A1 | 5/2007 | Nystrom et al. |
| 2007/0147536 A1 | 6/2007 | Melzer et al. |
| 2008/0075032 A1 | 3/2008 | Balachandran et al. |
| 2008/0107158 A1 | 5/2008 | Yoshii et al. |
| 2008/0137718 A1 | 6/2008 | Cha et al. |
| 2008/0165875 A1 | 7/2008 | Mundarath et al. |
| 2009/0034639 A1 | 2/2009 | Hwang et al. |
| 2009/0257519 A1 | 10/2009 | Lin et al. |
| 2010/0177649 A1* | 7/2010 | Ishii ...................... H04L 1/1854 370/252 |
| 2010/0238824 A1 | 9/2010 | Farajidana et al. |
| 2010/0238878 A1 | 9/2010 | Jang |
| 2010/0246429 A1* | 9/2010 | Hwang et al. ............... 370/252 |
| 2011/0200127 A1 | 8/2011 | Lee et al. |
| 2011/0249584 A1* | 10/2011 | Barbieri ............... H04L 1/0026 370/252 |
| 2011/0261781 A1 | 10/2011 | Vrzic et al. |
| 2011/0310853 A1* | 12/2011 | Yin ...................... H04L 1/0009 370/335 |
| 2012/0002568 A1* | 1/2012 | Tiirola ................ H04L 1/0026 370/252 |
| 2012/0039199 A1 | 2/2012 | Chen et al. |
| 2012/0039261 A1* | 2/2012 | Chin .................... H04L 1/0015 370/329 |
| 2012/0093010 A1* | 4/2012 | Vajapeyam et al. .......... 370/252 |
| 2012/0188976 A1* | 7/2012 | Kim .................... H04L 1/0025 370/329 |
| 2012/0327883 A1* | 12/2012 | Yang .................... H04L 1/0026 370/329 |
| 2013/0128759 A1* | 5/2013 | Luo et al. .................... 370/252 |
| 2013/0235756 A1* | 9/2013 | Seo ...................... H04L 1/0026 370/252 |
| 2013/0250885 A1* | 9/2013 | Davydov et al. ............. 370/329 |
| 2013/0315185 A1* | 11/2013 | Kim et al. .................... 370/329 |
| 2013/0343215 A1* | 12/2013 | Li et al. ........................ 370/252 |
| 2014/0169304 A1* | 6/2014 | DiGirolamo .......... H04L 1/0026 370/329 |
| 2014/0348019 A1* | 11/2014 | Barbieri ................ H04L 1/0026 370/252 |
| 2015/0071238 A1* | 3/2015 | Seo ...................... H04L 1/0026 370/329 |
| 2015/0156767 A1* | 6/2015 | Yin ...................... H04L 1/0009 370/335 |

FOREIGN PATENT DOCUMENTS

| | | |
|---|---|---|
| CN | 101399589 | 4/2009 |
| CN | 101416417 | 4/2009 |
| CN | 101626588 | 1/2010 |
| CN | 101 674 149 | 3/2010 |
| CN | 101 686 111 | 3/2010 |
| CN | 101 873 626 | 10/2010 |
| WO | 2010/105667 | 9/2010 |

OTHER PUBLICATIONS

NTT DoCoMo et al., "Uplink Physical Channel for Scheduling Request Transmission", 3GPP TSG RAN WGl Meeting #47bis, Sorrento, Italy, Jan. 15-19, 2007, pp. 1-4.

Nokia Siemens Networks et al.. "Configuration of Periodic CQI reporting on PUSCH", 3GPP TSG RAN WGl Meeting #52bis, Shenzhen, China, Mar. 31-Apr. 4, 2008, 2 sheets.

Ericsson: "Physical-layer parameters to be configured by RRC", 3GPP Draft; R1-082199, TSG-RAN WGI#53, Kansas City, US, May 5-9, 2008, 13 sheets.

\* cited by examiner

| MCS | Coding type | SNR/SINR |
|---|---|---|

Figure 4

| Subchannel mapping | MCS | Coding type | SNR/SINR |
|---|---|---|---|

Figure 5

| Subchannel mapping | MCS1 | MCS2 | Coding type | SINR |
|---|---|---|---|---|
| Bits: 4 | 7 | 7 | 2 | 8 |

Figure 6

| CQI in subchannel 1 | | | | CQI in subchannel 2 | | | |
|---|---|---|---|---|---|---|---|
| Subchannel mapping | MCS 1 | MCS 2 | Coding type | SINR | Subchannel mapping | MCS 1 | MCS 2 | Coding type | SINR |

Figure 7

| CQI in subchannel 1 | | | | CQI in subchannel 2 | | | |
|---|---|---|---|---|---|---|---|
| Subchannel mapping | MCS 1 | MCS 2 | Coding type | SINR | Subchannel mapping | MCS 1 | MCS 2 | Coding type | SINR |

| CQI in subchannel 3 | | | | CQI in subchannel 4 | | | |
|---|---|---|---|---|---|---|---|
| Subchannel mapping | MCS 1 | MCS 2 | Coding type | SINR | Subchannel mapping | MCS 1 | MCS 2 | Coding type | SINR |

Figure 8

METHOD FOR IMPLEMENTING LINK SELF-ADAPTATION, NETWORK DEVICE AND TERMINAL DEVICE

CROSS-REFERENCE TO RELATED APPLICATION

This application claims the priority of a Chinese patent application No. 201110081285.2 filed on Mar. 31, 2011 and titled "METHOD AND SYSTEM FOR IMPLEMENTING LINK ADAPTATION BASED ON CHANNEL QUALITY INDICATION FEEDBACK", which is incorporated herein by reference in its entirety.

This application claims the priority of a Chinese patent application No. 201110130194.3 filed on May 19, 2011 and titled "COMMUNICATION SYSTEM", which is incorporated herein by reference in its entirety.

This application claims the priority of a Chinese patent application No. 201110188814.9 filed on Jul. 7, 2011 and titled "METHOD, SYSTEM AND SYSTEM FOR IMPLEMENTING LINK ADAPTATION BASED ON CHANNEL QUALITY INDICATION FEEDBACK", which is incorporated herein by reference in its entirety.

This application claims the priority of a Chinese patent application No. 201110188947.6 filed on Jul. 6, 2011 and titled "COMMUNICATION METHOD, WIRELESS COMMUNICATION SYSTEM AND DEVICE FOR IMPLEMENTING MULTI-INPUT MULTI-OUTPUT", which is incorporated herein by reference in its entirety.

This application claims the priority of a Chinese patent application No. 201210029178.X filed on Feb. 10, 2012 and titled "METHOD AND DEVICE FOR IMPLEMENTING LINK ADAPTATION", which is incorporated herein by reference in its entirety.

FIELD OF THE INVENTION

The present invention relates to the field of wireless communications, and in particular, to a method for implementing link adaptation, a network device and a user equipment.

BACKGROUND OF THE INVENTION

With the rapid development of wireless communication technologies, the severe shortage of spectrum resources has increasingly been a "bottleneck" for the development of the wireless communication industry. Since spectrum resources are most precious for a wireless communication system, it is essential to fully exploit the limited spectrum resources and improve the utilization efficiency of the spectrum.

An actual wireless communication channel is a time-varying fading channel, of which the performance (for example, throughput) is ever changing. Traditionally, the channel is designed with fixed information transmission parameters such as a channel coding and modulation mode and transmission power, which apparently are not suitable for the time-varying channel. Thus, there is provided a link adaptation technology, in which parameters of a transceiver, such as transmission power, a modulation mode, a coding rate, retransmission times and a data frame length, are dynamically adjusted according to a change of wireless channel environment in a wireless communication system, so that wireless channel resources can be optimally utilized.

Channel Quality Information (CQI) indicates the estimated channel quality information such as the size of a transmission block that can be correctly received, the modulation mode and the number of parallel codes, given that a reasonable block error rate is ensured in the downlink or uplink direction. By measuring the current wireless receiving environment, a user equipment pre-estimates the maximum CQI value that is permitted currently, while the base station selects a suitable downlink or uplink channel transmission format including the transmission block size, the modulation mode, the number of parallel codes, a reference power correction value, etc., according to the estimated CQI from the user equipment, thereby performing link adaptation adjustment.

With the rapid development of wireless communication technologies, it is more demanding for the method for implementing a link adaptation mechanism.

SUMMARY OF THE INVENTION

In view of the above, the technical problem to be solved by the invention is to provide a novel method for implementing link adaptation. A brief summary is given below to provide a basic understanding of some aspects of the embodiments disclosed. This section of summary is not to provide a general commentary, or to determine the key/important elements or to describe the protection scopes of these embodiments, but is merely to simply present some concepts, which act as a preamble of the subsequent detailed illustration.

To solve the above technical problem, the invention further provides a method for implementing link adaptation based on a CQI feedback, which includes:

sending, by a network device, a physical frame carrying a downlink sounding channel and a CQI feedback resource indication to a designated user equipment;

estimating, by the user equipment, the channel quality according to the downlink sounding channel after receiving the physical frame, and feeding back the CQI to the network device via the allocated resource; and receiving, by the network device, the CQI fed back by each user equipment, and selecting individual physical layer transmission parameters for the user equipment adaptively according to the CQI fed back.

In some alternative embodiments, the network device configures the downlink sounding channel in the System Information Channel of the physical frame, and configures a CQI feedback resource indication for each user equipment in the control channel (CCH) of the physical frame.

In some alternative embodiments, the CQI feedback resource indication includes: an STA identity, an indication of allocated time and frequency resources, a feedback type and a feedback cycle; and the indication of resource allocated includes: a symbol offset, duration, a subchannel indication and a CQI transmission mode which includes a Modulation and Coding Scheme (MCS) and a Number of Spatial Streams (Nss).

In some alternative embodiments, the user equipment monitors the feedback cycle, and directly feeds back the CQI to the network device by using the resource indication allocated in the preceding cycle when the feedback cycle elapses.

In some alternative embodiments, the CQI fed back by the user equipment is packaged on a MAC layer into a channel quality feedback frame, which includes: a MAC frame header, a frame body and an FCS, where the frame body includes the CQI of each subchannel.

In some alternative embodiments, the CQI of each subchannel includes: an MCS, an Nss, a coding type and a Signal to Noise Ratio (SNR) or a Signal to Interference plus Noise Ratio (SINR).

In some alternative embodiments, the CQI of each subchannel includes: an MCS, a coding type and a Signal to Noise Ratio (SNR) or a Signal to Interference plus Noise Ratio (SINR).

To solve the above technical problem, the invention further provides a wireless communication system in which link adaptation is implemented based on a CQI feedback, and the system includes:

a network device, for sending a physical frame carrying a downlink sounding channel and a CQI feedback resource indication to a designated user equipment; and a user equipment, for estimating the channel quality according to the downlink sounding channel after receiving the physical frame, and feeding back the CQI to the network device according to the allocated resource.

After receiving the CQI fed back by each user equipment, the network device determines a transmission parameter for the user equipment during the subsequent downlink scheduling of the user equipment according to the CQI fed back in conjunction with the upper-layer service information, and send data to the user equipment.

To solve the above technical problem, the invention further provides a method for implementing link adaptation based on a CQI feedback, and the method includes steps of:

sending, by a network device, a channel explorer frame to a designated user equipment, and requesting the user equipment to feed back the CQI;

estimating and calculating, by the user equipment, the channel quality after receiving the channel explorer frame, and feeding back the CQI to the network device according to the CQI feedback request; and receiving, by the network device, the CQI fed back by each user equipment, determining the scheduling of each user equipment according to the CQI fed back in conjunction with the upper-layer service information, allocating a corresponding physical layer transmission parameter, and sending data to the user equipment.

The channel explorer frame sent by the network device is packaged on the MAC layer, and a MAC frame includes a MAC frame header and a frame body. The frame body carries information about CQI feedback requests to a plurality of STAs, including an STA identity, and a CQI feedback request and feedback type.

In some alternative embodiments, the channel explorer frame is sent via a downlink transmission channel of the physical frame, the network device configures the downlink sounding channel in the System Information Channel of a physical frame, and indicates, in a control channel of the physical frame, the corresponding uplink CQI feedback resource to a user equipment that is required for the CQI feedback.

In some alternative embodiments, the CQI feedback resource indication of a user equipment includes: an STA identity and an indication of allocated time and frequency resources; the indication of allocated time and frequency resources includes: a symbol offset, duration, a subchannel indication and a CQI transmission mode which includes an MCS and an Nss.

In some alternative embodiments, the feedback type is a CQI feedback; the CQI fed back by the user equipment is packaged on a MAC layer into a channel quality feedback frame, which includes a MAC frame header, a frame body and an FCS, where the frame body includes the CQI of a subchannel of each operating bandwidth.

In some alternative embodiments, the CQI of a subchannel of each operating bandwidth includes: an MCS, an Nss, a coding type and an SNR or SINR.

In some alternative embodiments, the CQI of each subchannel includes: an MCS, a coding type and an SNR or SINR.

In some alternative embodiments, before feeding back the CQI to the network device according to the CQI feedback request, the method further includes:

estimating and calculating, by the user equipment, the channel quality according to the downlink sounding channel of the physical frame in some alternative embodiments.

To solve the above technical problem, the invention further provides a wireless communication system in which link adaptation is implemented based on a CQI feedback, and the system includes:

a network device, for sending a channel explorer frame to each user equipment in a broadcast mode, and requesting the user equipment to feed back CQI; here, the channel explorer frame is packaged on a MAC layer and transferred via a downlink transmission channel of the physical frame, the channel explorer frame includes a MAC frame header and a frame body, while the frame body carries CQI feedback requests and a feedback type of one or more user equipments.

After receiving the channel explorer frame, the user equipment estimates the channel quality according to the downlink sounding channel, and feeds back the CQI to the user equipment at a designated location according to the allocated resource.

After receiving the CQI fed back by each user equipment, the network device determines the transmission parameter for the user equipment during the subsequent downlink scheduling of the user equipment according to the CQI fed back in conjunction with the upper-layer service information, and sends data to the user equipment.

To solve the above technical problem, the invention provides a method for implementing link adaptation, including:

sending a downlink sounding channel and a CQI feedback resource indication; and receiving CQI, and selecting a suitable transmission mode for downlink data transmission according to the CQI.

In some alternative embodiments, the CQI feedback resource indication contains an STA identity and an indication of resource allocated.

In some alternative embodiments, the indication of resource allocated specifically includes one or more of: a symbol offset, duration, subchannel mapping and a CQI transmission mode; where:

the CQI transmission mode includes a Modulation and Coding Scheme (MCS) and a Number of Spatial Streams (Nss).

In some alternative embodiments, the CQI feedback resource indication contains a feedback cycle, which is used for instructing a user equipment to feed back the CQI periodically.

In some alternative embodiments, the method further includes:

monitoring, by the user equipment, the time according to the feedback cycle, and directly feeding back the CQI once a feedback cycle elapses.

In some alternative embodiments, the method further includes:

sending a CQI feedback request for instructing a user equipment to feed back the CQI.

The CQI feedback request is packaged on a MAC layer into an explorer frame for sending, or is indicated via a control channel on a physical layer.

In some alternative embodiments, the method further includes:

feeding back, by the user equipment, the CQI via a feedback resource according to the CQI feedback resource indication in response to the CQI feedback request.

In some alternative embodiments, the CQI includes one or more of:

a Modulation and Coding Scheme (MCS), which is used for identifying a modulation and coding scheme of the requested frequency band;

a coding type, which is used for identifying a coding mode recommended by the STA;

a Signal to Noise Ratio (SNR), which is used for identifying an average Signal to Noise Ratio on the requested bandwidth and spatial streams; and subchannel mapping, which is used for identifying the bandwidth of a feedback subchannel and the sequence number of the corresponding specific subchannel.

In some alternative embodiments, the CQI includes one or more of:

an MCS, which is used for identifying a modulation and coding scheme of the requested frequency band;

a coding type, which is used for identifying a coding mode recommended by the STA;

a Signal to Interference plus Noise Ratio (SINR), which is used for identifying an average Signal to Interference plus Noise Ratio on the requested bandwidth and spatial streams; and a subchannel mapping, which is used for identifying the bandwidth of a feedback subchannel and the sequence number of the corresponding specific subchannel.

In some alternative embodiments, the Modulation and Coding Scheme is divided into a first Modulation and Coding Scheme and a second Modulation and Coding Scheme.

To solve the above technical problem, the invention further provides a network device, including:

a sending unit, for sending a downlink sounding channel and a CQI feedback resource indication;

a receiving unit, for receiving CQI; and a processing unit, for selecting a suitable transmission mode for downlink data transmission according to the CQI.

In some alternative embodiments, the CQI feedback resource indication contains an STA identity and an indication of resource allocated.

In some alternative embodiments, the indication of resource allocated specifically includes one or more of: a symbol offset, duration, subchannel mapping and a CQI transmission mode; where, the CQI transmission mode further includes: an MCS and an Nss.

In some alternative embodiments, the CQI feedback resource indication contains a feedback cycle used for instructing a user equipment to feed back the CQI periodically.

In some alternative embodiments, the sending unit is further adapted to send a CQI feedback request, for instructing a user equipment to feed back the CQI in response to the CQI feedback request.

In some alternative embodiments, the sending unit is specifically adapted to package the CQI feedback request on a MAC layer into an explorer frame for sending, or is specifically adapted to indicate the CQI feedback request via a control channel on a physical layer.

In some alternative embodiments, the CQI includes one or more of:

an MCS, which is used for identifying a modulation and coding scheme of the requested frequency band;

a coding type, which is used for identifying a coding mode recommended by the STA;

a Signal to Noise Ratio (SNR), which is used for identifying an average Signal to Noise Ratio on the requested bandwidth and spatial streams; and subchannel mapping, which is used for identifying the bandwidth of a feedback subchannel and the sequence number of the corresponding specific subchannel.

In some alternative embodiments, the CQI includes one or more of:

an MCS, which is used for identifying a modulation and coding scheme of the requested frequency band;

a coding type, which is used for identifying a coding mode recommended by the STA;

a Signal to Interference plus Noise Ratio (SINR), which is used for identifying an average Signal to Interference plus Noise Ratio on the requested bandwidth and spatial streams; and subchannel mapping, which is used for identifying the bandwidth of a feedback subchannel and the sequence number of the corresponding specific subchannel.

In some alternative embodiments, the Modulation and Coding Scheme is divided into a first Modulation and Coding Scheme and a second Modulation and Coding Scheme.

To solve the above technical problem, the invention further provides a user equipment, including:

a receiving unit, for receiving a downlink sounding channel and a CQI feedback resource indication;

a detecting unit, for detecting the downlink sounding channel and obtaining the CQI; and a feedback unit, for feeding back the CQI via a feedback resource.

In some alternative embodiments, the CQI feedback resource indication contains an STA identity and an indication of resource allocated.

In some alternative embodiments, the indication of resource allocated specifically includes one or more of: a symbol offset, duration, subchannel mapping and a CQI transmission mode; where, the CQI transmission mode contains an MCS and an Nss.

In some alternative embodiments, the CQI feedback resource indication contains a feedback cycle used for instructing a user equipment to feed back the CQI periodically;

The feedback unit is adapted to monitor the time according to the feedback cycle, and directly feed back the CQI once a feedback cycle elapses.

In some alternative embodiments, the receiving unit is further adapted to receive a CQI feedback request.

In some alternative embodiments, the feedback unit is adapted to feed back the CQI via a feedback resource according to the CQI feedback resource indication in response to the CQI feedback request.

In some alternative embodiments, the CQI contains one or more of:

an MCS, which is sued for identifying a modulation and coding scheme of the requested frequency band;

a coding type, which is used for identifying a coding mode recommended by the STA;

a Signal to Noise Ratio (SNR), which is used for identifying an average Signal to Noise Ratio on the requested bandwidth and spatial streams; and subchannel mapping, which is used for identifying the bandwidth of a feedback subchannel and the sequence number of the corresponding specific subchannel.

In some alternative embodiments, the CQI includes one or more of:

an MCS, which is used for identifying a modulation and coding scheme of the frequency band requested;

a coding type, which is used for identifying a coding mode recommended by the STA;

a Signal to Interference plus Noise Ratio (SINR), which is used for identifying an average Signal to Interference plus Noise Ratio on the requested bandwidth and spatial streams; and subchannel mapping, which is used for identifying the bandwidth of a feedback subchannel and the sequence number of the corresponding specific subchannel.

In some alternative embodiments, the Modulation and Coding Scheme is divided into a first Modulation and Coding Scheme and a second Modulation and Coding Scheme.

As can be seen, in the technical solutions for implementing downlink adaptation according to the invention, a periodic feedback mechanism is employed to save signaling overhead, thereby saving system resources; with the employed feedback requesting mechanism, a CAP is enabled to configure and manage the CQI feedbacks by one or more STAs, resource configuration may be optimized as much as possible, a system efficiency may be improved, and the CAP may implement an overall arrangement of channel resources, so that a user may further multiplex the space resources, thereby the spectrum utilization may be improved. Thus, with the solutions of the invention, spectrum resources may be adaptively scheduled, and spectrum utilization and system performance may be improved.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

BRIEF DESCRIPTION OF THE DRAWINGS

FIG. 4 is a structural representation of a Channel Quality Information feedback frame in a specific scene according to the second embodiment of the invention;

FIG. 5 is a structural representation of a Channel Quality Information feedback frame in a specific scene according to the second embodiment of the invention;

FIG. 6 is a schematic diagram showing the frame body of a Channel Quality Information feedback frame according to the second embodiment of the invention;

FIG. 7 is a schematic diagram showing the frame body of a Channel Quality Information feedback frame according to the second embodiment of the invention;

FIG. 8 is a schematic diagram showing the frame body of a Channel Quality Information feedback frame according to the second embodiment of the invention;

DETAILED DESCRIPTION OF THE EMBODIMENTS

Figure 1:
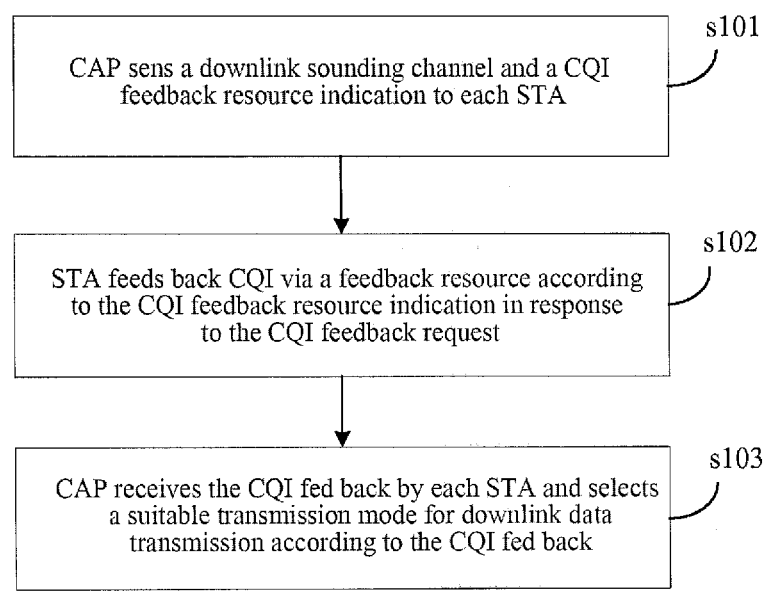
FIG. 1 is a schematic flow chart of a method for implementing link adaptation according to a first embodiment of the invention.

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

In view of the shortages in the prior art, the invention proposes a method for implementing downlink adaptation, thereby improving the spectrum resource utilization and system performance.

The link adaptation is closely correlated to other mechanisms such as a beam shaping mechanism and a Multi-User MIMO (MU-MIMO) mechanism, and all such mechanisms are adaptation technologies employed for adapting to channel changes and improving link and system capacities, and may share partial feedback results, or may be considered simultaneously during the calculating of feedback results by a responding end. The invention merely involves a method for implementing link adaptation based on a Channel Quality Information feedback.

Network devices mentioned in the invention may be, for example, an Access Point (AP), a Central Access Point (CAP), a base station and so on, and user equipments mentioned in the invention may be, for example, a user station (STA), a user equipment and so on. The description below is illustrated by taking the CAP as an example of the network device and the STA as an example of the user equipment, but not limited to the CAP and the STA.

In the invention, a link adaptation mechanism includes downlink adaptation and uplink adaptation, in the case of a medium and short-distance wireless communication system. Here, the downlink adaptation refers to link adaptation in a direction from the CAP to the STA; and the uplink adaptation refers to link adaptation in a direction from the STA to the CAP.

1. Downlink Adaptation

In a medium and short-distance wireless communication system, a link adaptation mechanism is supported in downlink data transmission. A CAP may adaptively select different physical-layer transmission parameters for an STA according to the CQI fed back by the STA, where the parameters include a MIMO operating mode, the Number of Spatial Streams (NSS), a Modulation and Coding Mode (MCS), transmission power, etc.

The feedback mechanisms supported by the downlink adaptation may include three mechanisms of a periodic feedback mechanism, a request-response based feedback mechanism and an active response-based feedback mechanism.

The invention will be illustrated mainly with reference to the periodic feedback mechanism and the request-response based feedback mechanism.

A First Embodiment

Referring to FIG. 1, the first embodiment of the invention provides a method for implementing downlink adaptation, which includes the following steps:

Step S101: sending, by a CAP, a downlink sounding channel and a CQI feedback resource indication to each STA;

Step S102: feeding back the CQI via a feedback resource according to the CQI feedback resource indication by the STA in response to a CQI feedback request; and Step S103: receiving, by the CAP, the CQI fed back by each STA, and selecting a suitable transmission mode for downlink data transmission according to the CQI fed back.

A Second Embodiment

Referring to FIG. 1, the second embodiment of the invention provides a method for implementing downlink adaptation, which employs a periodic feedback mechanism and includes the following steps S101-S103:

Step S101: sending, by a CAP, a downlink sounding channel and a CQI feedback resource indication to each STA.

Preferably, the downlink sounding channel and the CQI feedback resource indication may be packaged in a physical frame for sending.

Preferably, the CQI feedback resource indication contains a feedback cycle used for instructing the STA to periodically feed back the CQI.

The so-called periodic feedback mechanism is such that the CAP periodically allocates, within a control channel at the physical layer, a resource for the uplink channel feedback by the STA, without requiring the CAP to send any CQI feedback request. Thus, preferably, the CAP may make the following preparations before Step S101:

The CAP configures a downlink sounding channel within the System Information Channel of a physical frame, for sending a downlink sounding signal, to allow an STA to perform downlink channel measurement and obtain the CQI.

The CAP periodically allocates to the STA, within a control channel of the physical frame, a resource for the uplink channel feedback by the STA, which is specifically realized by configuring the CQI feedback resource indication in the control channel.

Preferably, the information in the CQI feedback resource indication contains: the identity (ID) of each STA (STAID) and the indication of the allocated resource. Here, information in the indication of the allocated resource specifically contains one or more of: a symbol offset, duration, subchannel mapping and a CQI transmission mode. The symbol offset is used for indicating the starting OFDM symbol of a user resource block; the duration is used for indicating the number of continuous OFDM symbols of a user resource block; the subchannel mapping is used for indicating a CQI feedback subchannel via BitMap; and the CQI transmission mode includes the Modulation and Coding Scheme (MCS) and the Number of Spatial Streams (Nss).

Preferably, the CQI feedback resource indication contains: a STAID, indication of the allocated resource and a feedback cycle.

Preferably, in order to save signaling overhead for periodic resource allocation, for the same STA, the CAP need not configure a CQI feedback resource indication in the control channel periodically; instead, the CAP may notify the STA about information such as resource allocation and a feedback cycle at a time by sending merely a physical frame carrying the CQI feedback resource indication; the STA stores the latest indication of resource allocated and the feedback cycle that are received; thus the CAP need not carry the CQI feedback resource indication in several frames sent subsequently. The STA monitors the time, and once the stored latest feedback cycle elapses, it may directly feed the CQI back to the CAP according to the stored latest CQI feedback resource indication through a feedback resource by default. For example, in the schematic frame structure diagram showing physical frame configuration in FIG. 2, a CAP allocates a CQI feedback resource and a feedback cycle to user stations STA1, STA2 and STA3 in a previous feedback cycle (i.e. the physical frame N shown in FIG. 2), then when the next feedback cycle (i.e. the physical frame N plus the feedback cycle shown in FIG. 2) is reached, the user stations STA1, STA2 and STA3 may transmit CQI via a designated location in an uplink subframe directly by monitoring the feedback cycle and utilizing the above CQI feedback resource indication, without the requirement for the CAP to reallocate a CQI feedback resource and a feedback cycle to each STA.

Step S102: feeding back the CQI over a feedback resource according to the CQI feedback resource indication by the STA in response to the CQI feedback request.

Preferably, the STA receives the downlink sounding channel and the CQI feedback resource indication sent by the CAP, detects the downlink sounding channel to obtain the CQI, and periodically feeds the CQI back to the network device over a feedback resource according to the CQI feedback resource indication. Specifically, the STA monitors the expiration of the feedback cycle, and periodically feeds the CQI back to the network device directly over a feedback resource according to the CQI feedback resource indication once the feedback cycle elapses.

Figure 2:
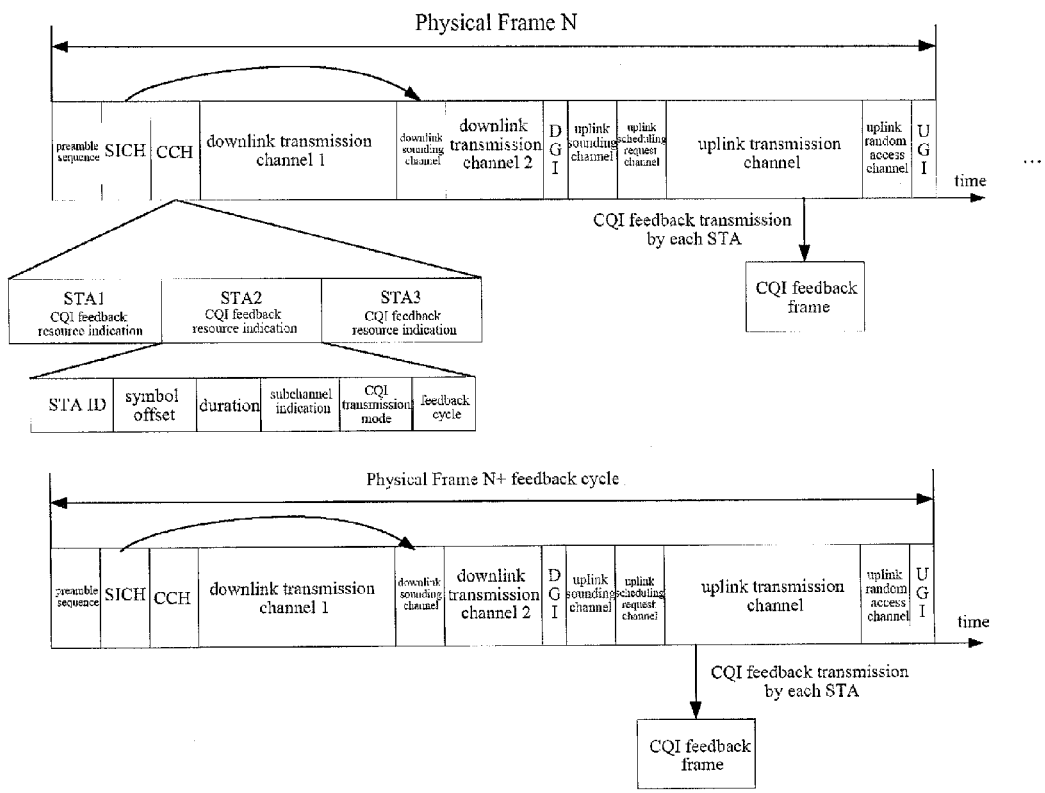
FIG. 2 is a schematic frame structure diagram showing the physical frame configuration in a method for implementing downlink adaptation based on a periodic feedback mechanism according to a second embodiment of the invention.

Preferably, the CQI may be packaged into a MAC frame which forms a CQI feedback frame. The CQI feedback frame includes a MAC frame header, a frame body and a Frame Check Sequence (FCS), and the frame body may be used for feeding back the CQI of each operating bandwidth (preferably, the CQI of all subchannels 1 to 4, as shown in FIG. 2) according to the feedback type indication, or used by the STA to feed back the CQI of one or two subchannels with good channel quality. Here, the CQI may include one or more of: an MCS, an Nss, a coding type (LDPC/BCC), a Signal to Noise Ratio (SNR) or Signal to Interference plus Noise Ratio (SINR).

Figure 3:
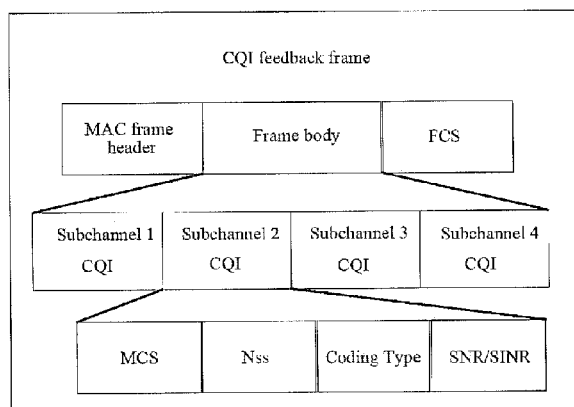
FIG. 3 is a structural representation of a Channel Quality Information feedback frame according to the second embodiment of the invention.

Preferably, for example, as shown in FIG. 3, the CQI may include the MCS, the Nss, the coding type (LDPC/BCC) and the SNR (or SINR).

Preferably, as shown in FIG. 4, the CQI may also include the MCS, the coding type and the SNR (or SINR), and the MCS may include the Nss. The MCS is used for identifying the Modulation and Coding Scheme of the requested frequency band; the coding type is used for identifying the coding mode recommend by a user equipment; the SNR is used for identifying an average Signal to Noise Ratio of all spatial streams on the requested channel; and the SINR is used for identifying an average Signal to Interference plus Noise Ratio of all spatial streams on the requested channel.

Preferably, as shown in FIG. 5, the CQI may also include subchannel mapping, which is used for identifying the bandwidth of a feedback subchannel and the corresponding specific subchannel sequence number.

Preferably, if a system supports the transmission of 8 spatial streams and an MCS supports the transmission of up to 4 spatial streams, two MCSs are needed. As shown in FIG. 6, there may be two MCSs, i.e., a first Modulation and Coding Scheme MCS1 which represents the MCS of a code word 1 on the requested channel, and a second Modulation and Coding Scheme MCS2 which represents the MCS of code word 2 on the requested channel. Preferably, the CQI may include the subchannel mapping, the Modulation and Coding Schemes MCS1 and MCS2, the coding type and the SINR. The content of the CQI is as shown in Table 1 below.

TABLE 1

| Field | Length (bit) | Description |
| --- | --- | --- |
| subchannel mapping | 4 | 0001: feedback subchannel 0<br>0010: feedback subchannel 1<br>0100: feedback subchannel 2<br>1000: feedback subchannel 3 |
| MCS1 | 7 | MCS of a code word 1 on the requested channel |
| MCS2 | 7 | MCS of a code word 2 on the requested channel; |
| coding type | 2 | representing the coding mode recommended by STA,<br>0: BCC:<br>1: LDPC code length 1;<br>2: LDPC code length 2;<br>3: LDPC code length 3; |
| S1NR | 8 | an average S1NR of all spatial streams on the requested channel if the decimal number corresponding to this field is denoted by n with a value of 0~255, S1NR is represented by −10 + 0.25 · n. |

When the system operates at a bandwidth of 20 MHz, the frame body of the CQI feedback frame is as shown in FIG. 4, 5 or 6.

When the system operates in a 40 MHz aggregation mode 1, the frame body of the CQI feedback frame is as shown in FIG. 7.

When the system operates at an 80 MHz aggregation mode 1, the frame body of the CQI feedback frame is as shown in FIG. 8.

When the system operates at a 40 MHz aggregation mode 2, the frame body of the CQI feedback frame is as shown in FIG. 6.

When an 80 MHz system operates at continuous bandwidths of 40 MHz, the frame body of the CQI feedback frame is as shown in FIG. 7.

When the system operates at continuous bandwidths of 80 MHz, the frame body of the CQI feedback frame is as shown in FIG. 6.

The aggregation mode mentioned above will be specifically described below.

Spectrum Aggregation

In the present section, with a basic channel bandwidth of 20 MHz, 40 MHz and 80 MHz bandwidths with continuous or non-continuous spectrum may be supported via spectrum aggregation.

At an aggregation mode 1, each 20 MHz subchannel is an independent channel, and a 20 MHz, 40 MHz or 80 MHz STA may be scheduled to perform independent transmission on one or more 20 MHz subchannels.

At an aggregation mode 2, a plurality of continuous 20 MHz subchannels are aggregated, and a 40 MHz or 80 MHz STA may perform continuous transmission in the frequency domain on the aggregated channel.

The 20 MHz STA is limited to merely the aggregation mode 1, while a 40 MHz or 80 MHz STA may select the aggregation mode 1 or 2.

FIG. 2 is a schematic frame structure diagram showing the physical frame configuration in a method for implementing downlink adaptation based on a periodic feedback mechanism according to the second embodiment of the invention. As shown in FIG. 2, a CAP configures a downlink sounding channel in the System Information Channel of a physical frame in advance, and allocates a CQI transmission resource to an STA that is requested for a channel quality feedback (e.g. STA1, STA2 or STA3) in a control channel of the physical frame, which is specifically realized by configuring a CQI feedback resource indication on the control channel. The stations STA1, STA2 and STA3 calculate and estimate the channel information according to the downlink sounding channel of the physical frame received, and periodically transmit the CQI via a corresponding location in an uplink subframe of the current frame.

Step S103: receiving, by the CAP, the CQI fed back by each STA, and selecting a suitable transmission mode for downlink data transmission according to the CQI fed back.

After receiving the CQI fed back by each STA, the CAP determines the service scheduling of each STA in conjunction with upper-layer service information including parameters such as a service priority and QoS, determines transmission parameters during the subsequent downlink scheduling of the stations STA1, STA2 and STA3, and then sends data to the corresponding STA.

Figure 9:
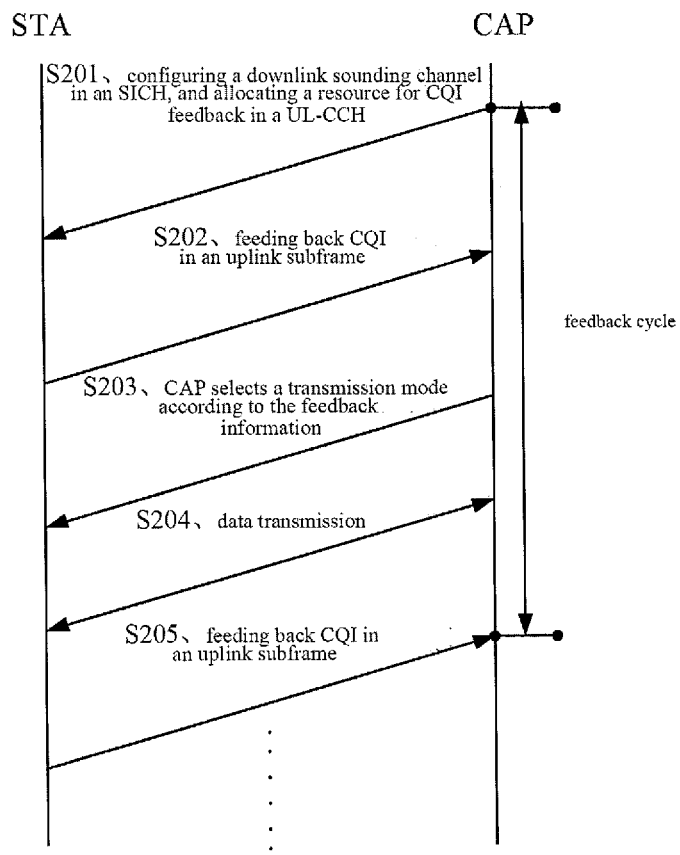
FIG. 9 is a schematic flow chart of a method for implementing downlink adaptation based on a periodic feedback mechanism according to the second embodiment of the invention.

The method proposed in the second embodiment may also be represented in FIG. 9. As shown in FIG. 9, the method includes:

Step S201: configuring, by a CAP, a downlink sounding channel in a System Information Channel (SICH) of a physical frame, and allocating a resource for CQI feedback in a control channel UL-CCH of the physical frame;

Step S202: feeding back CQI via an uplink subframe by an STA;

Step S203: selecting, by the CAP, a transmission mode according to the feedback information;

Step S204: performing uplink and downlink data transmission between the CAP and the STA; and Step S205: monitoring time by the STA, and feeding back the CQI via an uplink subframe once a feedback cycle elapses.

Preferably, after Step S204, in order to save signaling overhead for the same STA, the CAP need not configure a CQI feedback resource indication in the control channel periodically; instead, the CAP may configure and notify the STA about information such as resource allocation and a feedback cycle at a time via Step S201; the STA stores the latest indication of resource allocated and the feedback cycle that are received; thus the CAP need not carry the CQI feedback resource indication in several frames sent subsequently. The STA monitors the time, and once the stored latest feedback cycle elapses, the STA may directly transmit the CQI via a designated location in an uplink subframe according to the stored latest CQI feedback resource indication through a feedback resource by default, that is, Step S205 is performed.

Preferably, after Step S205, the method further includes a step A: selecting, by the CAP, a transmission mode according to the feedback information, and performing uplink and downlink data transmission between the CAP and the STA.

Preferably, after Step S205, the method further includes a step B: performing uplink and downlink data transmission between the CAP and the STA. In such a case, the CAP does not reselect a transmission mode; instead, it adopts the configuration in Step S203 by default.

Preferably, after the step A or B, a step of feeding back CQI via an uplink subframe the when a feedback cycle elapses by the STA is repeated, and so on.

Figure 10:
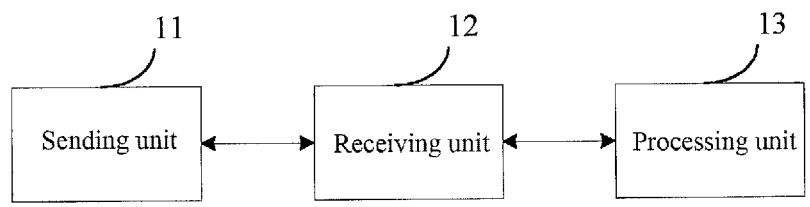
FIG. 10 is a structural representation of a network device according to the second embodiment of the invention.

To realize the above method for implementing link adaptation, the second embodiment of the invention further provides a network device as shown in FIG. 10, which includes:

a sending unit 11, for sending a downlink sounding channel and a Channel Quality Information (CQI) feedback resource indication to a user equipment;

a receiving unit 12, for receiving the CQI fed back by each user equipment; and a processing unit 13, for selecting a suitable transmission mode for downlink data transmission according to the CQI fed back.

Figure 11:
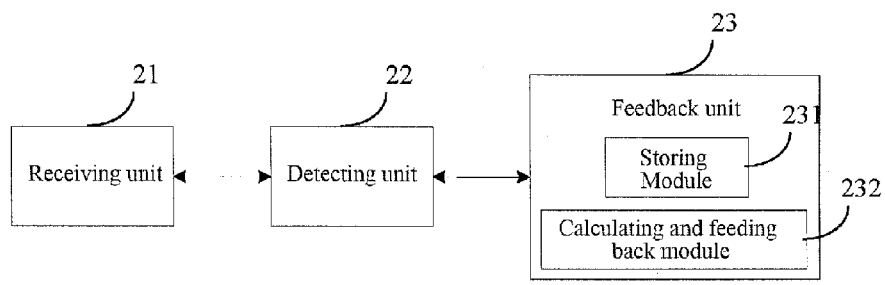
FIG. 11 is a structural representation of a user equipment according to the second embodiment of the invention.

To realize the above method for implementing link adaptation, the second embodiment of the invention further provides a user equipment as shown in FIG. 11, which includes:

a receiving unit 21, for receiving a downlink sounding channel and a CQI feedback resource indication;

a detecting unit 22, for detecting the downlink sounding channel and obtaining the CQI; and a feedback unit 23, for feeding back the CQI via a feedback resource. Preferably, the CQI is periodically fed back to the network device via the feedback resource according to the CQI feedback resource indication.

Preferably, the CQI feedback resource indication at least contains the following information of a user equipment identity, an indication of resource allocated and a feedback cycle. The feedback unit 23 monitors the time according to the feedback cycle, and directly feeds back the CQI once a feedback cycle elapses.

To realize the above method for implementing link adaptation, the second embodiment of the invention further provides a system for implementing link adaptation, which includes the network device and the user equipment according to the second embodiment.

The operating principles and the related operation flows of the system for implementing link adaptation, the network device and the user equipment according to the second embodiment of the invention are basically the same as those in the embodiment of the above method for implementing downlink adaptation based on the periodic feedback mechanism, and thus will not be described further hereinafter.

As can be seen from the above, with the employed periodic feedback mechanism in the second embodiment, signaling overhead and hence system resources may be saved, thereby improving the spectrum utilization, and spectrum resources may be adaptively scheduled, thus spectrum utilization and system performance may be improved.

A Third Embodiment

Referring to FIG. 1, a third embodiment of the invention provides a method for implementing downlink adaptation, which employs a request-response feedback mechanism and mainly includes the following steps S101-S103.

Step S101: sending, by a CAP, a downlink sounding channel and a CQI feedback resource indication to each STA.

Preferably, before sending the downlink sounding channel and the CQI feedback resource indication, the CAP further sends a CQI feedback request which is used for instructing an STA to feed back the CQI.

Preferably, after sending the downlink sounding channel and the CQI feedback resource indication, the CAP further sends a CQI feedback request.

Preferably, the CQI feedback request is sent at the same time when the CAP sends the downlink sounding channel and the CQI feedback resource indication.

Preferably, the downlink sounding channel, the CQI feedback request and the CQI feedback resource indication may be packaged in a physical frame for sending.

Figure 12:
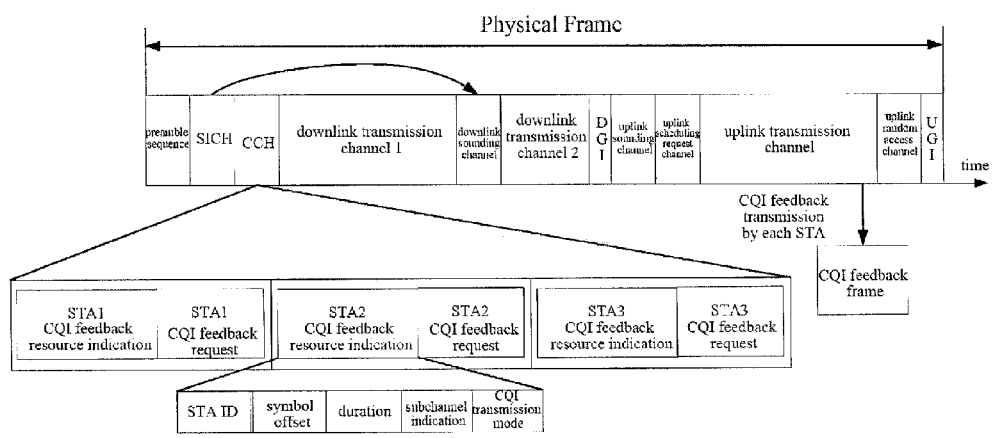
FIG. 12 is a schematic frame structure diagram showing the physical frame configuration for the downlink adaptation based on a request-response feedback mechanism according to a third embodiment of the invention.

Preferably, the CQI feedback request is indicated via a control channel of the physical frame, as shown in FIG. 12.

Preferably, before Step S201, the CAP may also make the following preparations in advance:

the CAP configures a downlink sounding channel in the System Information Channel of a physical frame in advance for sending a downlink sounding signal, to enable the STA to perform downlink channel measurement and obtain the CQI; and the CAP configures a CQI feedback request and a CQI feedback resource indication in the control channel in advance.

The definition of fields of the system information channel is as shown in Table 2.

TABLE 2

| Bits | Definition | Description |
| --- | --- | --- |
| $b_7 b_6 \ldots b_0$ | 8 less significant bits of MAC address of the current CAP | CAP identity and scrambling seed |
| $b_{20} b_{19} \ldots b_8$ | Reserved | Reserved |
| $b_{23} b_{22} b_{21}$ | CAP antenna configuration | 000: one antenna<br>001: two antennas<br>. . .<br>111: eight antennas |
| $b_{29} b_{28} \ldots b_{24}$ | control channel cycle indication | control channel cycle, ≤63 OFDM symbols |
| $b_{31} b_{30}$ | Reserved | Reserved |
| $b_{40} b_{39} \ldots b_{32}$ | downlink transmission channel cycle indication | downlink transmission channel cycle, ≤511 OFDM symbols |
| $b_{47} b_{46} \ldots b_{41}$ | Reserved | Reserved |

TABLE 2-continued

| Bits | Definition | Description |
|---|---|---|
| $b_{56}b_{55} \ldots b_{48}$ | uplink transmission channel cycle indication | uplink transmission channel cycle, ≤511 OFDM symbols |
| $b_{63}b_{62} \ldots b_{57}$ | Reserved | Reserved |
| $b_{64}$ | downlink sounding channel configuration | 0: no downlink sounding channel 1: downlink sounding channel is configured |
| $b_{66}b_{65}$ | Reserved | Reserved |
| $b_{68}b_{67}$ | uplink sounding channel configuration | 00: no uplink sounding channel 01: uplink sounding channel occupies 1 OFDM symbol 10: uplink sounding channel occupies 2 OFDM symbols 11: uplink sounding channel occupies 4 OFDM symbols |
| $b_{70}b_{69}$ | uplink scheduling request channel configuration | 00: no scheduling request channel 01: scheduling request channel occupies 1 OFDM symbol 10: scheduling request channel occupies 2 OFDM symbols 11: scheduling request channel occupies 4 OFDM symbols |
| $b_{71}$ | uplink random access channel configuration | 0: no uplink random access channel 1: uplink random access channel occupies 1 OFDM symbol |
| $b_{75}b_{74} \ldots b_{72}$ | Reserved | Reserved |
| $b_{87}b_{86} \ldots b_{76}$ | frame label | 0~4095, count of frame sequence number |
| $b_{103}b_{102} \ldots b_{88}$ | CRC of 16 bits | CRC check protection |
| $b_{111}b_{110} \ldots b_{104}$ | Return-to-Zero bits of a convolution code encoder | nullify a convolution code ending state |

As shown in Table 2, a downlink sounding channel is configured by a bit $b_{64}$, a value 0 of which represents that no downlink sounding channel is configured, and a value 1 of which represents that a downlink sounding channel is configured.

The CAP allocates a CQI transmission resource to each STA in a control channel, by specifically configuring a CQI feedback resource indication in the control channel. The CQI feedback resource indication specifically includes: a symbol offset and the duration. The symbol offset indicates the starting OFDM symbol of a user resource block, and the duration indicates the number of continuous OFDM symbols of a user resource block.

The definition of fields of the control channel is as shown in Table 3.

TABLE 3

| Bit | Definition DL | UL |
|---|---|---|
| $b_0$ | $b_0 = 1$, downlink scheduling $b_0 = 0$, uplink scheduling | |
| $b_1$ | $b_1 = 0$, time-division resource scheduling $b_1 = 1$, Reserved | |
| $b_5b_4 \ldots b_2$ | $[b_5b_4 \ldots b_2]$, Bit Map indicating the location of a valid 20 MHz subchannel of the scheduling signaling | |
| $b_7b_6$ | indicating a transmission mode of the current scheduling 00: open-loop SU-MIMO transmission 01: closed-loop SU-MIMO transmission 10: closed-loop MU-MIMO transmission (valid only when $b_0 = 1$) 11: Reserved | |
| $b_{16}b_{15} \ldots b_8$ | the starting OFDM symbol of a user resource block, with a field value from 1 to 511 | |
| $b_{23}b_{22} \ldots b_{17}$ | MCS and parallel Nss (≤4) of code word I (appendix A) | |
| $b_{32}b_{31} \ldots b_{24}$ | the number of continuous OFDM symbols of a user resource block, with a field value from 1 to 511 | |
| $b_{39}b_{38} \ldots b_{33}$ | MCS and parallel Nss of code word II 1111111: the current transmission is SU-MIMO without code word II 1111110: the current transmission is 2-stream MU-MIMO 1111101: the current transmission is 3-stream MU-MIMO 1111100: the current transmission is 4-stream MU-MIMO 1111011: the current transmission is 5-stream MU-MIMO 1111010: the current transmission is 6-stream MU-MIMO 1111001: the current transmission is 7-stream MU-MIMO 1111000: the current transmission is 8-stream MU-MIMO 0000000~1100011: MCS and number of streams of SU-MIMO code word II (appendix A) | $b_{36}b_{35} \ldots b_{33}$: BitMap indicating a feedback subchannel of CQI, CSI, BFM or CMI $b_{39}b_{38}b_{37}$: indicating the number of rows of a feedback matrix in the case of CSI feedback; and indicating the number of columns of a feedback matrix in the case of BFM feedback |

TABLE 3-continued

| Bit | Definition DL | UL |
|---|---|---|
| $b_{42}b_{41}b_{40}$ | SU-MIMO: 000<br>MU-MIMO: index of the starting position of a spatial stream, with a field value from 0 to 7 | $b_{40}$ = 1: requesting for CQI feedback<br>$b_{42}b_{41}$ = 01: requesting for CSI feedback<br>$b_{42}b_{41}$ = 10: requesting for BFM feedback<br>$b_{42}b_{41}$ = 11: requesting for CMI feedback |
| $b_{44}b_{43}$ | 00: BCC code<br>01: LDPC code length 1 (1344 bits)<br>10: LDPC code length 2 (2688 bits)<br>11: LDPC code length 3 (5376 bits) | |
| $b_{45}$ | 0: time-domain demodulation pilot cycle 1 (long demodulation pilot cycle)<br>1: time-domain demodulation pilot cycle 2 (short demodulation pilot cycle) | |
| $b_{47}b_{46}$ | 00: frequency-domain demodulation pilot pattern 1 (DPI = 1)<br>01: frequency-domain demodulation pilot pattern 2 (DPI = 2)<br>10: frequency-domain demodulation pilot pattern 3 (DPI = 4)<br>11: Reserved | |
| $b_{54}b_{53} \ldots b_{48}$ | Reserved | |
| $b_{55}$ | 0: STBC transmission is not employed<br>1: STBC transmission is employed | |
| $b_{71}b_{70} \ldots b_{56}$ | CRC check protection and STA ID | |

As shown in Table 3, the symbol offset, i.e., the starting OFDM symbol of a user resource block, is indicated by bits $b_{16}b_{15} \ldots b_8$; and the duration, i.e., the number of continuous OFDM symbols of a user resource block, is indicated by bits $b_{32}b_{31} \ldots b_{24}$.

Wherein, a CQI feedback request is indicated via a control channel; and specifically, a CQI feedback request is indicated by a bit $b_{40}=1$.

Preferably, the request-response based feedback mechanism refers to that a CAP actively sends a CQI feedback request according to a specific scene. Once deciding to initiate a CQI feedback request, the CAP indicates the CQI feedback request in a control channel; at the same time, the CAP allocates, in the control channel, a corresponding CQI transmission resource to the STA that is requested for the CQI feedback; here, the control channel may simultaneously contain information of a plurality of CQI feedback resource indications allocated to STAs, and such information includes indication information such as an STA identity (STAID) and an indication of resource allocated, where the indication of resource allocated specifically includes a symbol offset, duration and a subchannel indication; preferably, the indication of resource allocated further includes a CQI transmission mode, which specifically includes an MCS and an Nss.

Step S102: feeding back the CQI via a feedback resource according to the CQI feedback resource indication by the STA, in response to the CQI feedback request.

Preferably, the STA detects the downlink sounding channel to obtain the CQI, and feeds back via a feedback resource according to the indication of the CQI feedback request in response to the CQI feedback request.

Preferably, the feedback resource is a resource designated by the CAP, and the STA feeds back the CQI via the designated resource.

The so-called designated resource refers to some specific OFDM symbols of the uplink transmission channel that are designated via the uplink control channel and used for sending channel information to be fed back. Given that the CAP indicates the starting OFDM symbol of a user resource block and the number of continuous OFDM symbols of the user resource block by bits $b_{16}b_{15} \ldots b_8$ and $b_{32}b_{31} \ldots b_{24}$ of the control channel, respectively, the STA may feed back the channel information via the designated resource block. Thus, the allocation of the feedback resource on the uplink control channel is specifically implemented by indicating the starting OFDM symbol of a user resource block and the number of continuous OFDM symbols of the user resource block via the uplink control channel.

The specific description of the CQI fed back is the same as that in the first embodiment, and thus will not be described further hereinafter.

Step S103: receiving, by the CAP, the CQI fed back by each STA, and selecting a suitable transmission mode for downlink data transmission according to the CQI fed back.

Preferably, after receiving the CQI fed back by each STA, the CAP determines the service scheduling of each STA in conjunction with the upper-layer service information including parameters such as a service priority and QoS, selects a suitable transmission mode for downlink data transmission, and allocates a corresponding physical layer transmission parameter for downlink data transmission.

Figure 13:
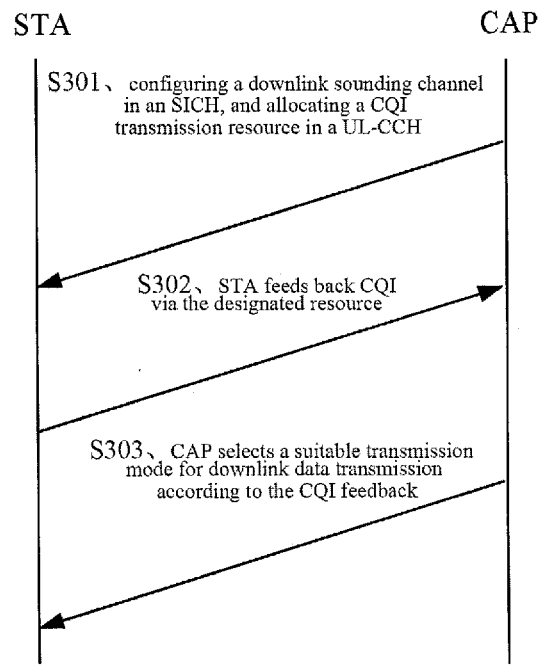
FIG. 13 is a schematic flow chart of a method for implementing downlink adaptation based on a request-response feedback mechanism according to the third embodiment of the invention.

The method according to the third embodiment may also be described with reference to FIG. 13. As shown in FIG. 13, the method includes the following steps:

Step S301: configuring, by a CAP, a downlink sounding channel in an SICH, and allocating a CQI transmission resource in a UL-CCH;

Step S302: feeding back, by an STA, the CQI via the resource designated; and

Step S303: selecting, by the CAP, a suitable transmission mode for downlink data transmission according to the CQI feedback.

Figure 14:
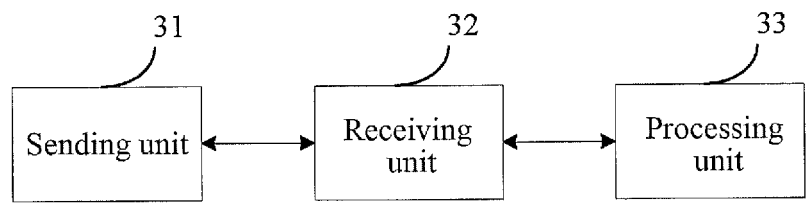
FIG. 14 is a structural representation of a network device according to the third embodiment of the invention.

To realize the above method for implementing link adaptation, the third embodiment of the invention further proposes a network device as shown in FIG. 14, which includes a sending unit 31, a receiving unit 32 and processing unit 33.

The sending unit 31 is used for sending a downlink sounding channel and a CQI feedback resource indication to a user equipment.

Preferably, the sending unit 31 is further adapted to send a CQI feedback request before sending the downlink sounding channel and the CQI feedback resource indication; where, the CQI feedback request is used for instructing an STA to feed back the CQI.

Preferably, the sending unit 31 is further adapted to send a CQI feedback request after sending the downlink sounding channel and the CQI feedback resource indication.

Preferably, the sending unit 31 is further adapted to send a CQI feedback request at the same time when sending the downlink sounding channel and the CQI feedback resource indication.

Preferably, the CQI feedback request may be packaged together with the downlink sounding channel and the CQI feedback resource indication in a physical frame for sending, where the CQI feedback request is indicated via a control channel of the physical frame.

The receiving unit 32 is used for receiving the CQI fed back by the user equipment.

The processing unit 33 is used for selecting a suitable transmission mode for downlink data transmission according to the CQI fed back.

Figure 15:
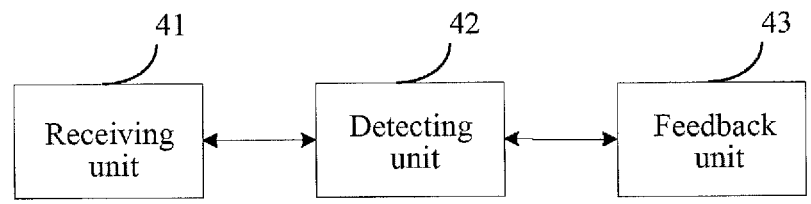
FIG. 15 is a structural representation of a user equipment according to the third embodiment of the invention.

To realize the above method for implementing link adaptation, the third embodiment of the invention further provides a user equipment as shown in FIG. 15, which includes:

a receiving unit 41, for receiving a downlink sounding channel and a CQI feedback resource indication sent by a network device; preferably, the receiving unit 41 is further adapted to receive a CQI feedback request;

a detecting unit 42, for detecting the downlink sounding channel and obtaining the CQI; and a feedback unit 43, for feeding back to the network device via a feedback resource, and preferably for feeding back to the network device via a feedback resource according to the indication of the CQI feedback request.

To realize the above method for implementing link adaptation, the third embodiment of the invention further provides a system for implementing link adaptation, which includes the network device and the user equipment according to the third embodiment.

The operating principles and the related operation flows of the system for implementing link adaptation, the network device and the user equipment according to the third embodiment of the invention are basically the same as those in the above embodiment of the method for implementing downlink adaptation using a request-response based feedback mechanism, and thus will not be described further hereinafter.

As can be seen from the above, the feedback requesting mechanism employed in this embodiment enables a CAP to configure and manage the CQI feedback of an STA, so that resource configuration may be optimized as much as possible, the system efficiency may be improved, and the CAP may implement an overall arrangement of channel resources, thus a user may further multiplex the space resources, thereby the spectrum utilization may be improved, spectrum resources may be adaptively scheduled, and the spectrum utilization and system performance may be improved. In addition, because a CQI feedback request is transferred first and then a CQI is fed back on the MAC layer, it is necessary to allocate resources to both the CQI feedback request and the CQI feedback by the control channel on the physical layer, at least two interactions are needed; however, in this embodiment, when a resource is allocated for the CQI feedback by the control channel of a physical layer, the CQI feedback request is indicated by 1 bit, thus the effect of two interactions on the MAC layer may be implemented by one interaction. Therefore, not only system overhead can be reduced, but also feedback requesting delay can be reduced.

A Fourth Embodiment

Referring to FIG. 1, a fourth embodiment of the invention provides another method for implementing downlink adaptation, which employs a request-response feedback mechanism and mainly includes the following steps S101-S103.

Step S101: sending, by a CAP, a downlink sounding channel and a CQI feedback resource indication to each STA.

Preferably, before sending the downlink sounding channel and the CQI feedback resource indication, the CAP further sends a CQI feedback request.

Preferably, after sending the downlink sounding channel and the CQI feedback resource indication, the CAP further sends a CQI feedback request.

Preferably, the CAP further sends a CQI feedback request at the same time when sending the downlink sounding channel and the CQI feedback resource indication.

Preferably, the fourth embodiment is different from the third embodiment in that: the CQI feedback request may be packaged on the MAC layer into a channel explorer frame and sent in a downlink transmission channel of the physical layer, where the channel explorer frame is a MAC frame. The channel explorer frame carries a CQI feedback request, which is adapted to request the STA for the CQI feedback. The CAP sends the channel explorer frame in a broadcast or unicast mode, and requests each STA to feed back the CQI. If the CAP sends out a multi-user CQI feedback request, the CQI feedback request contains CQI feedback requests for a plurality of STAs.

Preferably, before Step S101, the CAP may make the following preparations:

the CAP configures a downlink sounding channel in a System Information Channel of the physical layer, for sending a downlink sounding signal, so that an STA can perform downlink channel measurement and obtain the CQI.

The CAP may allocate, in a control channel, a CQI transmission resource to an STA to allow the STA to feed back the CQI, by specifically configuring an CQI feedback resource indication in the control channel. The control channel may simultaneously contain information of a plurality of CQI feedback resource indications allocated to STAs, and such information includes indication information such as the identity of each STA and the indication of resource allocated, where the information in the indication of resource allocated specifically includes a symbol offset and the duration. Preferably, the information in the indication of resource allocated may further include a CQI transmission mode which includes an MCS and an Nss.

Figure 16:
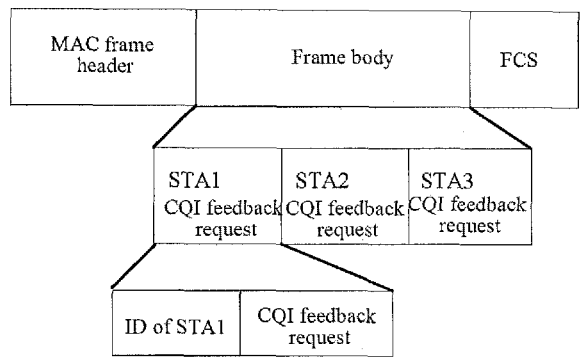
FIG. 16 is a structural representation of a channel explorer frame carrying a CQI feedback request according to a fourth embodiment of the invention.

Preferably, the channel explorer frame includes a MAC frame header and a frame body, and if it is sent in a broadcast mode, the CQI feedback request further contains an STA identity; when multi-user CQI feedback is requested, the frame body may carry the information of CQI feedback requests of a plurality of STAs, and the frame structure of the channel explorer frame in this case is as shown in FIG. 16.

Figure 17:
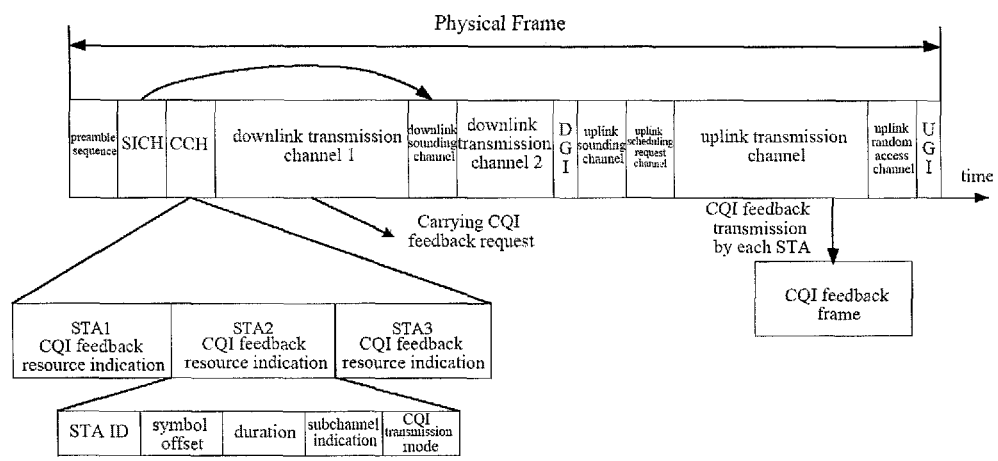
FIG. 17 is a schematic frame structure diagram showing the physical frame configuration for downlink adaptation based on a request-response feedback mechanism according to the fourth embodiment of the invention.

Preferably, the request-response based feedback mechanism refers to that a CAP actively sends a CQI feedback request to each STA according to a specific scene. Once deciding to initiate a CQI feedback resource request, the CAP packages a channel explorer frame carrying the CQI feedback request on the MAC layer, and sends the channel explorer frame on a downlink transmission channel of the physical frame, as shown in FIG. 17.

Step S102: feeding back the CQI via a feedback resource according to the CQI feedback resource indication by the STA in response to the CQI feedback request.

Preferably, after receiving the explorer frame, the STA estimates and calculates the channel quality according to the downlink sounding channel, and feeds back the CQI to the CAP according to the CQI feedback request; preferably, the STA feeds back the CQI to the CAP via a feedback resource according to the CQI feedback resource indication; preferably, the STA feeds back the CQI in an uplink subframe of the current frame according to the resource indicated by the control information in a low-cost modulation mode (for example, BPSK or QPSK or a single-stream mode); that is, the STA needs to package a MAC frame to transfer the CQI feedback information.

Preferably, the STA receives a downlink sounding channel, a CQI feedback request and a CQI feedback resource indication, and detects the downlink sounding channel; that is, the STA estimates and calculates the channel quality according to the downlink sounding channel to obtain the CQI, and feeds back via a feedback resource according to the indication of the CQI feedback request in response to the CQI feedback request.

The specific description of the CQI fed back is the same as that in the second embodiment, and will not be described further hereinafter.

Step S103: receiving, by the CAP, the CQI fed back by each STA, and selecting a suitable transmission mode for downlink data transmission according to the CQI fed back.

Preferably, after receiving the CQI fed back by each STA, the CAP determines the service scheduling of each STA in conjunction with the upper-layer service information, including parameters such as a service priority and QoS, and allocates a corresponding physical layer transmission parameter for the purpose of downlink data transmission, i.e. data transmission to the corresponding STA.

To realize the above method for implementing link adaptation, the fourth embodiment of the invention further provides a network device as shown in FIG. 14, which includes:

a sending unit 31, for sending a downlink sounding channel and a CQI feedback resource indication to a user equipment;

a receiving unit 32, for receiving the CQI fed back by the user equipment; and a processing unit 33, for selecting a suitable transmission mode for downlink data transmission according to the CQI fed back.

Preferably, the sending unit 31 is further adapted to send a CQI feedback request before sending the downlink sounding channel and the CQI feedback resource indication; where, the CQI feedback request is used for instructing an STA to feed back the CQI.

Preferably, the sending unit 31 is further adapted to send a CQI feedback request after sending the downlink sounding channel and the CQI feedback resource indication.

Preferably, the sending unit 31 is further adapted to send a CQI feedback request at the same time when sending the downlink sounding channel and the CQI feedback resource indication.

Preferably, the CQI feedback request may be packaged on the MAC layer into a channel explorer frame for sending.

Preferably, in the sending unit 31, the CQI feedback request may be packaged on the MAC layer into a channel explorer frame, and sent on a downlink transmission channel of the physical layer.

To realize the above method for implementing link adaptation, the fourth embodiment of the invention further provides a user equipment as shown in FIG. 15, which includes:

a receiving unit 41, for receiving a downlink sounding channel and a CQI feedback resource indication sent by a network device; preferably, the receiving unit 41 is further adapted to receive a CQI feedback request;

a detecting unit 42, for detecting the downlink sounding channel and obtaining the CQI; and a feedback unit 43, for feeding back to the network device via a feedback resource, and preferably, for feeding back to the network device via a feedback resource according to the indication of the CQI feedback request.

To realize the above method for implementing link adaptation, the fourth embodiment of the invention further provides a system for implementing link adaptation, which includes the network device and the user equipment of the fourth embodiment.

The operating principles and the related operation flows of the system for implementing link adaptation, the network device and the user equipment according to the fourth embodiment of the invention are basically the same as those in the above embodiment of the method for implementing downlink adaptation using a request-response based feedback mechanism, and thus will not be described further hereinafter.

As can be seen, the feedback requesting mechanism provided in this embodiment enables a CAP to configure and manage the CQI feedback of a plurality of STAs simultaneously, thus resource configuration may be optimized as much as possible, the system efficiency may be improved, and the CAP may implement an overall arrangement of channel resources, so that a user may further multiplex the space resources, thereby the spectrum utilization may be improved, and spectrum resources may be adaptively scheduled, thus the spectrum utilization and system performance may be improved.

The embodiments of the invention have been illustrated by taking a medium and short-distance communication system as an example; however, the invention is not limited to a medium and short-distance communication system, and other systems implemented by the method of the invention all fall into the scope of the invention.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word.

Additionally, any term "or" used in the claims or the specification intends to represent a "nonexclusive or".

What is claimed is:

1. A method for implementing link adaptation, comprising:
   sending, in a physical frame, a downlink sounding channel and a Channel Quality Information (CQI) feedback resource indication; and
   receiving CQI in the physical frame, in which the CQI feedback resource indication is sent, and selecting a suitable transmission mode for downlink data transmission according to the CQI;
   wherein the CQI feedback resource indication comprises an indication of resource allocated, and the indication of resource allocated comprises a symbol offset and a duration, wherein the symbol offset indicates a starting symbol of a user resource block, and the duration indicates a number of continuous symbols of the user resource block.

2. The method of claim 1, wherein, the CQI feedback resource indication further comprises an STA identity.

3. The method of claim 2, wherein, the indication of resource allocated further comprises at least one of subchannel mapping and a CQI transmission mode; wherein,
   the CQI transmission mode comprises a Modulation and Coding Scheme and a Number of Spatial Streams.

4. The method of claim 1, further comprising:
   allocating, within a control channel at the physical layer, resources for periodically feeding back CQI, wherein the CQI feedback resource indication contains a feedback period length, which is used for instructing a user equipment to feed back the CQI periodically according to the feedback period length.

5. The method of claim 4, further comprising:
   monitoring time, by the user equipment, according to the feedback period length, and directly feeding back the CQI once a feedback period elapses.

6. The method of claim 1, further comprising:
   sending a CQI feedback request, which is used for instructing a user equipment to feed back the CQI.

7. The method of claim 6, wherein, sending a CQI feedback request specifically comprises:
   packaging the CQI feedback request into an explorer frame on a MAC layer for sending, or indicating the CQI feedback request via a control channel on a physical layer.

8. The method of claim 6, further comprising:
   feeding back, by the user equipment, the CQI via a feedback resource according to the CQI feedback resource indication in response to the CQI feedback request.

9. The method of claim 1, wherein, the CQI comprises one or more of:
   a Modulation and Coding Scheme, which is used for identifying a modulation and coding scheme of the requested frequency band;
   a coding type, which is used for identifying a coding mode recommended by a STA;
   a Signal to Interference plus Noise Ratio, which is used for identifying an average Signal to Interference plus Noise Ratio of the requested bandwidth and spatial streams; and
   subchannel mapping, which is used for identifying the bandwidth of a feedback subchannel and the sequence number of the corresponding specific subchannel.

10. The method of claim 9, wherein, the Modulation and Coding Scheme is divided into a first Modulation and Coding Scheme and a second Modulation and Coding Scheme.

11. A network device, comprising a processor and a storage device, wherein the storage device stores processor-executable programs, and the programs comprise:
    a sending unit, for sending, in a physical frame, a downlink sounding channel and a Channel Quality Information (CQI) feedback resource indication;
    a receiving unit, for receiving CQI in the physical frame, in which the CQI feedback resource indication is sent; and
    a processing unit, for selecting a suitable transmission mode for downlink data transmission according to the CQI;
    wherein the CQI feedback resource indication comprises an indication of resource allocated, and the indication of resource allocated comprises a symbol offset and a duration, wherein the symbol offset indicates a starting symbol of a user resource block, and the duration indicates a number of continuous symbols of the user resource block.

12. The network device of claim 11, wherein, the CQI feedback resource indication further comprises an STA identity, and the indication of resource allocated further comprises at least one of subchannel mapping and a COT transmission mode; wherein:
    the CQI transmission mode further comprises: a Modulation and Coding Scheme and a Number of Spatial Streams.

13. The network device of claim 11, further comprising:
    an allocating unit allocating, within a control channel at the physical layer, resources for periodically feeding back CQI, wherein, the CQI feedback resource indication comprises a feedback period length, which is used for instructing a user equipment to feed back the CQI periodically according to the feedback period length.

14. The network device of claim 11, wherein:
    the sending unit is further adapted to send a CQI feedback request, which is used for instructing a user equipment to feed back the CQI in response to the CQI feedback request.

15. The network device of claim 11, wherein, the CQI comprises one or more of:
    a Modulation and Coding Scheme MCS, which is used for identifying a modulation and coding scheme of the requested frequency band; the Modulation and Coding Scheme is divided into a first Modulation and Coding Scheme and a second Modulation and Coding Scheme,
    a coding type, which is used for identifying a coding mode recommended by a STA;
    a Signal to Interference plus Noise Ratio, which is used for identifying an average Signal to Interference plus Noise Ratio of the requested bandwidth and spatial streams; and
    subchannel mapping, which is used for identifying the bandwidth of a feedback subchannel and the sequence number of the corresponding specific subchannel.

16. A user equipment, comprising a processor and a storage device, wherein the storage device stores processor-executable programs, and the programs comprise:
    a receiving unit, for receiving, in a physical frame, a downlink sounding channel and a Channel Quality Information (CQI) feedback resource indication;
    a detecting unit, for detecting the downlink sounding channel and obtaining CQI; and a feedback unit, for feeding back the CQI via a feedback resource in the physical frame, in which the CQI feedback resource indication is received;

wherein the CQI feedback resource indication comprises an indication of resource allocated, and the indication of resource allocated comprises a symbol offset and a duration, wherein the symbol offset indicates a starting symbol of a user resource block, and the duration indicates a number of continuous symbols of the user resource block.

17. The user equipment of claim 16, wherein, the CQI feedback resource indication further comprises an STA identity; the indication of resource allocated specifically further comprises at least one of subchannel mapping and a CQI transmission mode; wherein:

the CQI transmission mode contains a Modulation and Coding Scheme and a Number of Spatial Streams.

18. The user equipment of claim 16, wherein, the CQI feedback resource indication contains a feedback period length, which is used for instructing the user equipment to feed back the CQI periodically according to the feedback period length;

the feedback unit is adapted to monitor time according to the feedback period length, and directly feed back the CQI once a feedback period elapses.

19. The user equipment of claim 16, wherein, the CQI contains one or more of:

a Modulation and Coding Scheme, which is used for identifying a modulation and coding scheme of the requested frequency band;

a coding type, which is used for identifying a coding mode recommended by a STA;

a Signal to Interference plus Noise Ratio, which is used for identifying an average Signal to Interference plus Noise Ratio of the requested bandwidth and spatial streams; and subchannel mapping, which is used for identifying the bandwidth of a feedback subchannel and the sequence number of the corresponding specific subchannel.

20. The user equipment of claim 19, wherein, the Modulation and Coding Scheme is divided into a first Modulation and Coding Scheme and a second Modulation and Coding Scheme.

* * * * *